United States Patent
Carman

(10) Patent No.: US 6,637,760 B1
(45) Date of Patent: Oct. 28, 2003

(54) SULKY FOR SELF PROPELLED LAWN MOWER

(76) Inventor: Monte J. Carman, 9709 Sheffield Rd., Perrysburg, OH (US) 43551

( * ) Notice: Subject to any disclaimer, the term of this patent is extended or adjusted under 35 U.S.C. 154(b) by 0 days.

(21) Appl. No.: 09/795,679

(22) Filed: Feb. 28, 2001

Related U.S. Application Data

(60) Provisional application No. 60/186,020, filed on Mar. 1, 2000, provisional application No. 60/186,021, filed on Mar. 1, 2000, and provisional application No. 60/186,022, filed on Mar. 1, 2000.

(51) Int. Cl.[7] .............................................. B62D 63/00
(52) U.S. Cl. ....................... 280/32.7; 280/493; 280/494
(58) Field of Search ............................... 280/32.7, 494, 280/492, 493, 38; 172/677, 631, 450, 453; 180/15, 16; 56/14.9, 15.7, 15.9

(56) References Cited

U.S. PATENT DOCUMENTS

| | | | | |
|---|---|---|---|---|
| 5,413,364 A | * | 5/1995 | Hafendorfer | 172/433 |
| 5,810,371 A | * | 9/1998 | Velke | 280/32.7 |
| 5,882,020 A | * | 3/1999 | Velke | 280/32.7 |
| 5,947,505 A | * | 9/1999 | Martin | 280/32.7 |
| 6,000,705 A | * | 12/1999 | Velke | 280/32.7 |
| 6,062,582 A | * | 5/2000 | Martin | 280/32.7 |
| 6,145,855 A | * | 11/2000 | Bellis, Jr. | 280/32.7 |
| 6,234,495 B1 | * | 5/2001 | Velke | 280/32.7 |
| 6,375,201 B2 | * | 4/2002 | Havener | 280/32.7 |
| 2001/0026055 A1 | * | 10/2001 | Havener | 280/32.7 |

* cited by examiner

Primary Examiner—Brian L. Johnson
Assistant Examiner—J. Allen Shriver
(74) Attorney, Agent, or Firm—Gifford, Krass, Groh, Sprinkle, Anderson and Citkowski, P.C.

(57) ABSTRACT

A sulky for use with a self propelled lawn mower includes a mounting bracket having a pair of opposed upstanding mounting ears, a pivot arm that is pivotably connected to the mounting bracket, and a standing platform that is connected to the pivot arm for supporting an operator when the lawn mower is operated. A variety of connecting structures are shown between the mounting bracket, the pivot arm, and the standing platform that accommodate movement of the standing platform relative to the lawn mower, such as would occur when the lawn mower is operated over laterally uneven terrain.

7 Claims, 6 Drawing Sheets

SULKY FOR SELF PROPELLED LAWN MOWER

CROSS REFERENCE TO RELATED APPLICATIONS

This application claims the benefit of United States Provisional Application No. 60/186,020, filed Mar. 1, 2000, No. 60/186,021, filed Mar. 1, 2000, and No. 60/186,022, filed Mar. 1, 2000, the disclosures of which are incorporated herein by reference.

BACKGROUND OF THE INVENTION

This invention relates in general to an improved structure for a sulky for use with a self propelled lawn mower.

Lawn mowers are well known devices that are commonly used to cut grass and otherwise maintain the aesthetic appearance of lawns and other tracts of land. A typical lawn mower includes a frame that is supported on a plurality of wheels for rolling movement over the lawn. An engine or other source of rotational power is carried on the frame for selectively rotating a blade that cuts the grass. In the past, lawn mowers were manually pushed across the lawn by the operator. Although effective, such manually propelled lawn mowers have been found to be somewhat tiring to use. To address this, it is known to provide a seat on the frame of the lawn mower to allow the operator to sit thereon during use. In such instances, the engine has been connected to rotatably drive one or more wheels of the lawn mower such that it and the operator are self propelled across the lawn. A variety of such manually propelled and sit-down self propelled lawn mowers are known in the art.

In certain instances, such as in the lawn care industry, the use of manually propelled and sit-down self propelled lawn mowers has not been found to be efficient. In those instance, it has been found to be desirable to provide a self propelled lawn mower with a towed sulky, upon which the operator stands and is towed during use. A typical sulky structures includes a platform that is supported above the ground by one or more wheels. The platform is secured to the self propelled lawn mower by a bar or linkage. The operator of the lawn mower stands upon the platform and is towed by the lawn mower during use. Although a variety of sulky structures are known in the art, they have suffered from various deficiencies. Thus, it would be desirable to provide an improved structure for a sulky for use with a self propelled lawn mower.

SUMMARY OF THE INVENTION

This invention relates to an improved structure for a sulky for use with a self propelled lawn mower. In a first embodiment, the sulky includes a mounting bracket that can be secured to the rear end of a housing of the lawn mower. The mounting bracket has a pair of opposed upstanding mounting ears. The sulky also includes a pivot arm having a first end that is connected to the mounting bracket. To accomplish this, the first end of the pivot arm has a horizontally extending hollow tubular member that is sized to fit between the mounting ears secured to the mounting bracket. A kick pin can be inserted through the aligned openings formed through the mounting ears and the tubular member to pivotably connect the first end of the pivot arm to the mounting bracket. The pivot arm has a second end that is provided with a vertically extending hollow tubular member. The sulky further includes a yoke member including a pair of yoke arms and a mounting pin. The yoke arms have respective aligned openings formed therethrough. The interior of the hollow tubular member can be aligned with the openings formed through the yoke arms, and a retaining structure can be inserted through the aligned openings formed through the yoke arms and through the tubular member to pivotably connect the yoke member to the second end of the pivot arm. Lastly, the sulky includes an operator platform assembly including a hollow tubular support tube that is pivotably connected to the mounting pin. A standing platform is formed integrally with or secured to the support tube to support an operator of the sulky during use. A wheel is rotatably secured to each side of the standing platform. As the lawn mower is operated, the operator stands on the standing platform and is towed behind the lawn mower. The pivot arm of the sulky can pivot upwardly and downwardly relative to the mounting bracket to accommodate upward and downward movement of the standing platform relative to the lawn mower, such as would occur when the lawn mower is operated over hilly terrain. The yoke member of the sulky can pivot laterally (i.e., about a vertical axis defined by the pivot pin) relative to the pivot arm to accommodate turning movement of the standing platform relative to the lawn mower, such as would occur when the lawn mower is operated through a left or right turn. Lastly, the support tube and the standing platform can pivot transversely relative to the mounting pin (i.e., about a longitudinal axis extending generally parallel with the mounting pin) to accommodate transverse pivoting movement of the standing platform relative to the lawn mower, such as would occur when the lawn mower is operated over laterally uneven terrain.

In a second embodiment, the sulky includes a mounting bracket that can be secured to the rear end of a housing of the lawn mower. The mounting bracket has a pair of opposed upstanding mounting ears having a hollow support tube extending therebetween. The sulky also includes a pivot arm having a first end that is connected to the mounting bracket. To accomplish this, the first end of the pivot arm has a first pair of spaced apart yoke arms having respective axially aligned openings formed therethrough. The first yoke arms are spaced apart from one another by a distance that is slightly greater than the distance separating the mounting ears on the mounting bracket. Thus, the first yoke arms of the pivot arm can be disposed about the mounting ears such that the openings formed through the first yoke arms are aligned with the support tube. A retaining structure, such as a kick pin, can be inserted through the aligned openings formed through the yoke arms and the support tube to pivotably connect the first end of the pivot arm to the mounting bracket. The pivot arm has a second end that is provided with a vertically extending hollow tubular member. The sulky further includes a yoke member including a pair of yoke arms and a mounting pin. The yoke arms have respective aligned openings formed therethrough. The interior of the hollow tubular member can be aligned with the openings formed through the yoke arms, and a retaining structure can be inserted through the aligned openings formed through the yoke arms and through the tubular member to pivotably connect the yoke member to the second end of the pivot arm. Lastly, the sulky includes an operator platform assembly including a hollow tubular support tube that is pivotably connected to the mounting pin. A standing platform is formed integrally with or secured to the support tube to support an operator of the sulky during use. A wheel is rotatably secured to each side of the standing platform. As the lawn mower is operated, the operator stands on the standing platform and is towed behind the lawn mower. The pivot arm of the sulky can pivot upwardly and downwardly relative to the mounting bracket to accommodate upward and downward movement of the standing platform relative to the lawn mower, such as would occur when the lawn mower is operated over hilly terrain. The yoke member of the sulky can pivot laterally (i.e., about a vertical axis defined by the pivot pin) relative to the pivot arm to accommodate turning movement of the standing platform relative to the lawn mower, such as would occur when the lawn mower is operated through a left or right turn. Lastly, the support tube and the standing platform can pivot transversely relative to the mounting pin (i.e., about a longitudinal axis extending generally parallel with the mounting pin) to accommodate transverse pivoting movement of the standing platform relative to the lawn mower, such as would occur when the lawn mower is operated over laterally uneven terrain.

In a third embodiment, the sulky includes a mounting bracket that can be secured to the rear end of a housing of the lawn mower. The mounting bracket has a pair of opposed upstanding mounting ears having a hollow support tube extending therebetween. The sulky also includes a pivot arm having a first yoke end that is pivotably connected to the upstanding ears of the mounting bracket by a kick pin. The sulky further includes an operator platform assembly including a support bar that is pivotably connected to a second yoke end provided on the pivot arm. A pair of wheel assemblies are mounted on respective side portions of the support arm. A standing platform is secured to the central portion of the support bar to support an operator of the sulky during use. As the lawn mower is operated, the operator stands on the standing platform and is towed behind the lawn mower. The pivot arm of the sulky can pivot upwardly and downwardly relative to the mounting bracket to accommodate upward and downward movement of the standing platform relative to the lawn mower, such as would occur when the lawn mower is operated over hilly terrain. The central portion of the support bar of the sulky can pivot transversely relative to the pivot arm to accommodate transverse movement of the standing platform relative to the lawn mower, such as would occur when the lawn mower is operated over laterally uneven terrain. Lastly, the wheels of the sulky can pivot about a vertical axis relative to the angled side portions to accommodate turning movement of the standing platform relative to the lawn mower, such as would occur when the lawn mower is operated through a left or right turn.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
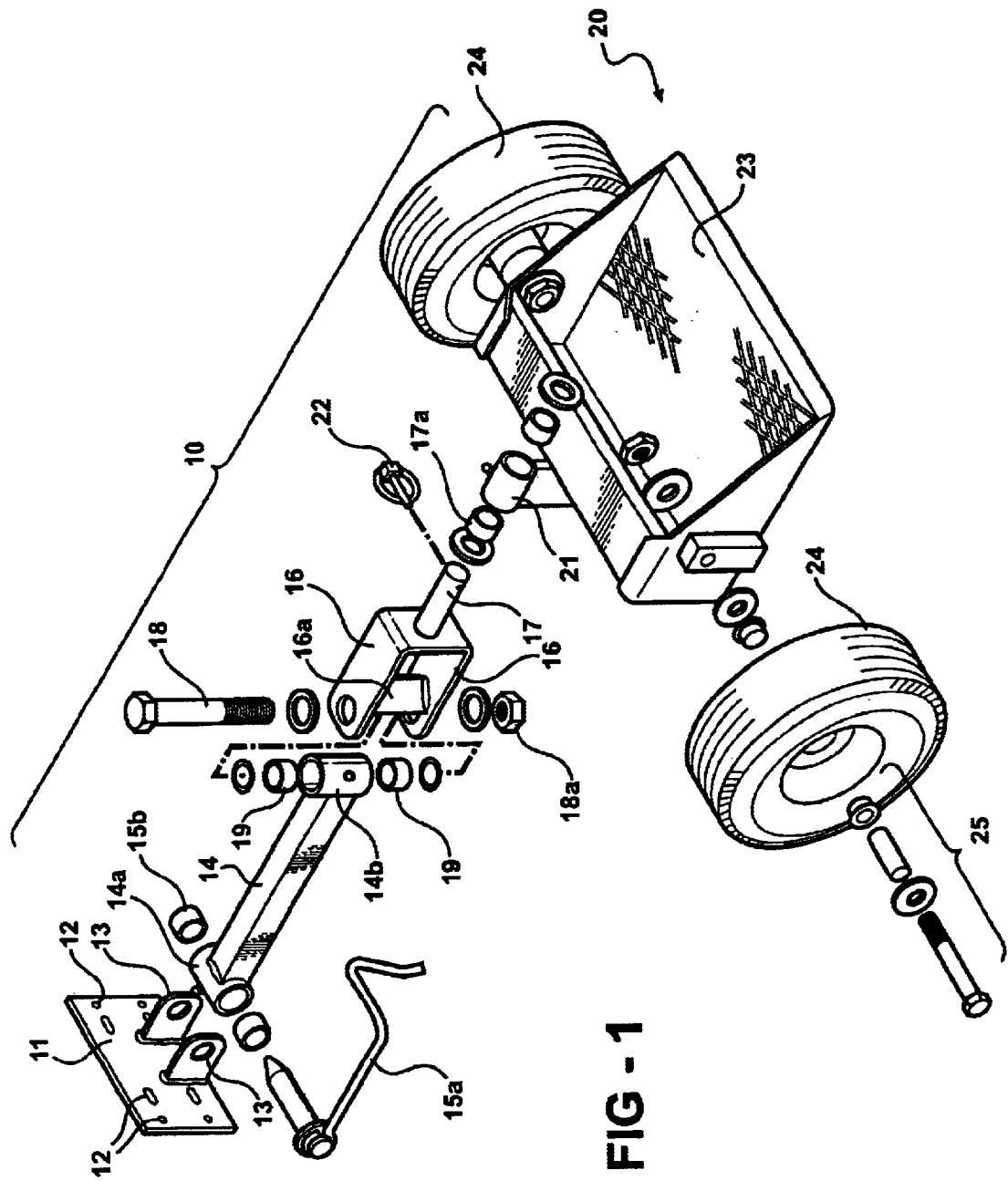
FIG. 1 is an exploded perspective view of a first embodiment of an improved structure for a sulky for use with a self propelled lawn mower in accordance with this invention.
Figure 2:
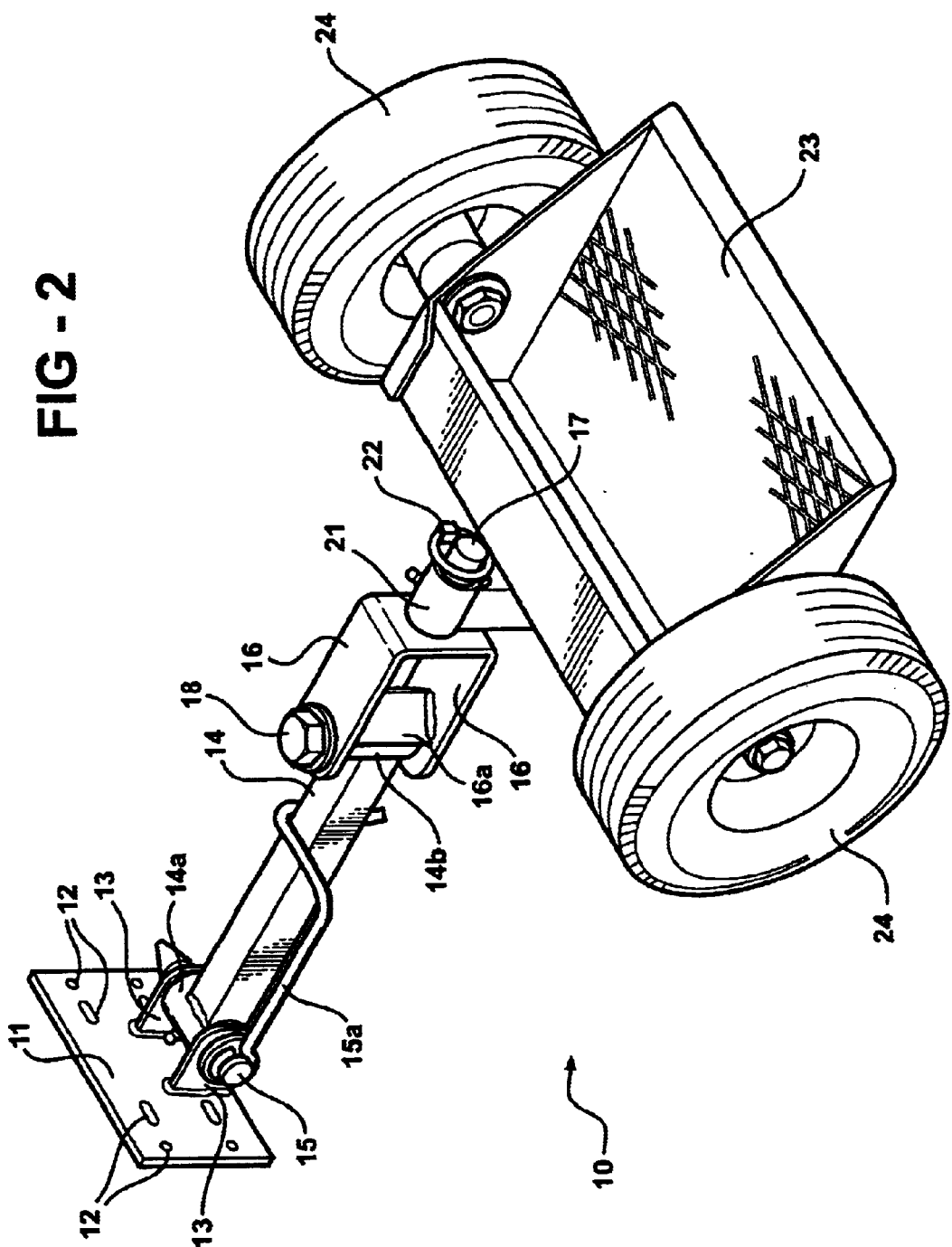
FIG. 2 is a perspective view of the improved structure illustrated in FIG. 1 shown assembled.

Referring now to FIGS. 1 and 2, there is illustrated a first embodiment of an improved structure for a sulky, indicated generally at 10, for use with a self propelled lawn mower (not shown) in accordance with this invention. The sulky 10 includes a mounting bracket 11 having one or more openings 12 formed therethrough to facilitate the securement of the mounting bracket 11 to a portion of the lawn mower, typically the rear end of a housing of the lawn mower. For example, one or more bolts (not shown) or other threaded fasteners may be used to secure the mounting bracket 11 to the rear end of a housing of the lawn mower. The mounting bracket 11 has a pair of opposed upstanding mounting ears 13 formed thereon or secured thereto in a conventional manner. For example, the mounting ears 13 may be formed from flat strips of metal stock that are welded or otherwise secured to the mounting bracket 11. Aligned openings are formed through the mounting ears 13 for a purpose that will be explained below.

The sulky 10 also includes a pivot arm 14 having a first end that is connected to the mounting bracket 11. To accomplish this, the first end of the pivot arm 14 is formed or otherwise provided with a horizontally extending hollow tubular member 14a. The tubular member 14a is preferably formed as a separate piece and permanently secured to the first end of the pivot arm 14, such as by welding. The tubular member 14a is sized to fit between the mounting ears 13 secured to the mounting bracket 11. Preferably, the mounting ears 13 are spaced apart from one another by a distance that is slightly greater than the length of the tubular member 14a. Thus, the interior of the hollow tubular member 14a can be aligned with the openings formed through the mounting ears 13. A retaining structure, such as a kick pin 15, can be inserted through the aligned openings formed through the mounting ears 13 and the tubular member 14a to pivotably connect the first end of the pivot arm 14 to the mounting bracket 11. The kick pin 15 can include a retaining member 15a that is sized and shaped to extend over a portion of the pivot arm 15 as shown in FIG. 2 to positively retain the kick pin 15 inserted through the aligned openings formed through the mounting ears 13 and the tubular member 14a. If desired, a pair of tubular bushings 15a may be provided between the kick pin 15 and the tubular member 14a. The pivot arm 14 has a second end of the pivot arm 14 that is formed or otherwise provided with a vertically extending hollow tubular member 14b. The tubular member 14b is preferably formed as a separate piece and permanently secured to the first end of the pivot arm 14, such as by welding. The purpose for the tubular member 14b will be explained below.

The sulky 10 further includes a yoke member including a pair of yoke arms 16 and a mounting pin 17. In the illustrated embodiment, the yoke arms 16 are formed from a single piece of material that is formed having a generally U-shaped configuration. The yoke arms 16 have respective aligned openings formed therethrough. Preferably, the yoke arms 16 are spaced apart from one another by a distance that is slightly greater than the length of the tubular member 14b. Thus, the interior of the hollow tubular member 14b can be aligned with the openings formed through the yoke arms 16. If desired, a generally V-shaped bracket 16a can be secured between the two yoke arms 16, such as by welding. The bracket 16a provides additional strength to the yoke member and can be used as an abutment surface to facilitate the quick and easy alignment of the interior of the hollow tubular member 14b with the openings formed through the yoke arms 16.

A retaining structure, such as a pivot pin 18, can be inserted through the aligned openings formed through the yoke arms 16 and through the tubular member 14b to pivotably connect the yoke member to the second end of the pivot arm 14. The pivot pin 18 can include a nut 18a that is threaded onto a threaded end portion of the pivot pin to positively retain the pivot pin 18 inserted through the aligned openings formed through the yoke arms 16 and through the tubular member 14b. If desired, a pair of tubular bushings 19 may be provided between the kick pin 15 and the tubular member 14a. The mounting pin 17 may be formed integrally with or secured to the first and second yoke arms 16. The mounting pin 17 is preferably formed as a separate piece and permanently secured to the first and second yoke arms 16, such as by welding. If desired, one or more bushings 17a may be disposed about the mounting pin 17 for a purpose that will be explained below. The outermost end of the mounting pin 17 has a transverse aperture formed therethrough, also for a purpose that will be explained below.

Lastly, the sulky 10 includes an operator platform assembly, indicated generally at 20, including a hollow tubular support tube 21 that is connected to the mounting pin 17. To connect the mounting pin 17 to the support tube 21, the mounting pin 17 is inserted through the hollow tube 21. When so disposed, the outermost end of the mounting pin 17 extends completely through the support tube 21, allowing a retaining clip 22 to be inserted through the transverse aperture formed through the outermost end of the mounting pin 17. The retaining clip 22 functions to positively connect the mounting pin 17 to the support tube 21. Although it connected to the mounting pin 17, the support tube 21 is free to rotate relative thereto. The purpose for providing this rotatable connection will be explained below.

A standing platform 23 is formed integrally with or secured to the support tube 21 to support an operator of the sulky 10 during use. Preferably, the standing platform 23 is formed as a separate member that is secured to the central portion 21 of the support bar by welding. A wheel 24 is rotatably secured to each side of the standing platform 23. To accomplish this, respective axle assemblies 25 are provided for the wheels 24. Each of the axle assemblies 25 is conventional in the art and is provided to connect each of the wheels 24 to the standing platform 23 for relative rotational movement.

In operation, the sulky 10 is connected to the rear end of a housing of the lawn mower by means of the mounting bracket 11 and threaded fasteners. As the lawn mower is operated, the operator stands on the standing platform 23 and is towed behind the lawn mower. The pivot arm 14 of the sulky 10 can pivot upwardly and downwardly relative to the mounting bracket 11 to accommodate upward and downward movement of the standing platform 23 relative to the lawn mower, such as would occur when the lawn mower is operated over hilly terrain. The yoke member of the sulky 10 can pivot laterally (i.e., about a vertical axis defined by the pivot pin 18) relative to the pivot arm 14 to accommodate turning movement of the standing platform 23 relative to the lawn mower, such as would occur when the lawn mower is operated through a left or right turn. Lastly, the support tube 21 and the standing platform 23 can pivot transversely (i.e., about a longitudinal axis extending generally parallel with the mounting pin 17) relative to the mounting pin 17 to accommodate transverse pivoting movement of the standing platform 23 relative to the lawn mower, such as would occur when the lawn mower is operated over laterally uneven terrain.

Figure 3:
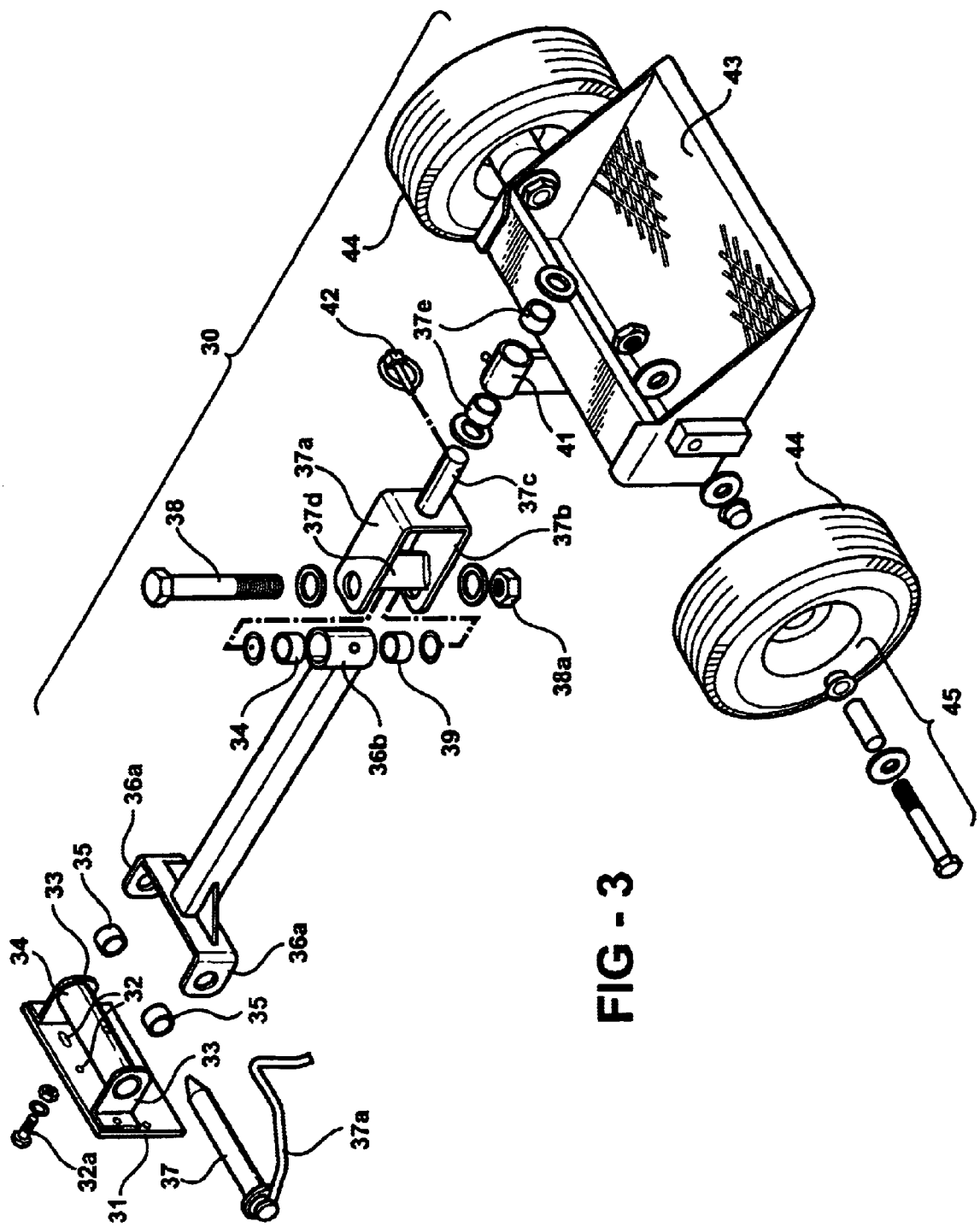
FIG. 3 is an exploded perspective view of a second embodiment of an improved structure for a sulky for use with a self propelled lawn mower in accordance with this invention.
Figure 4:
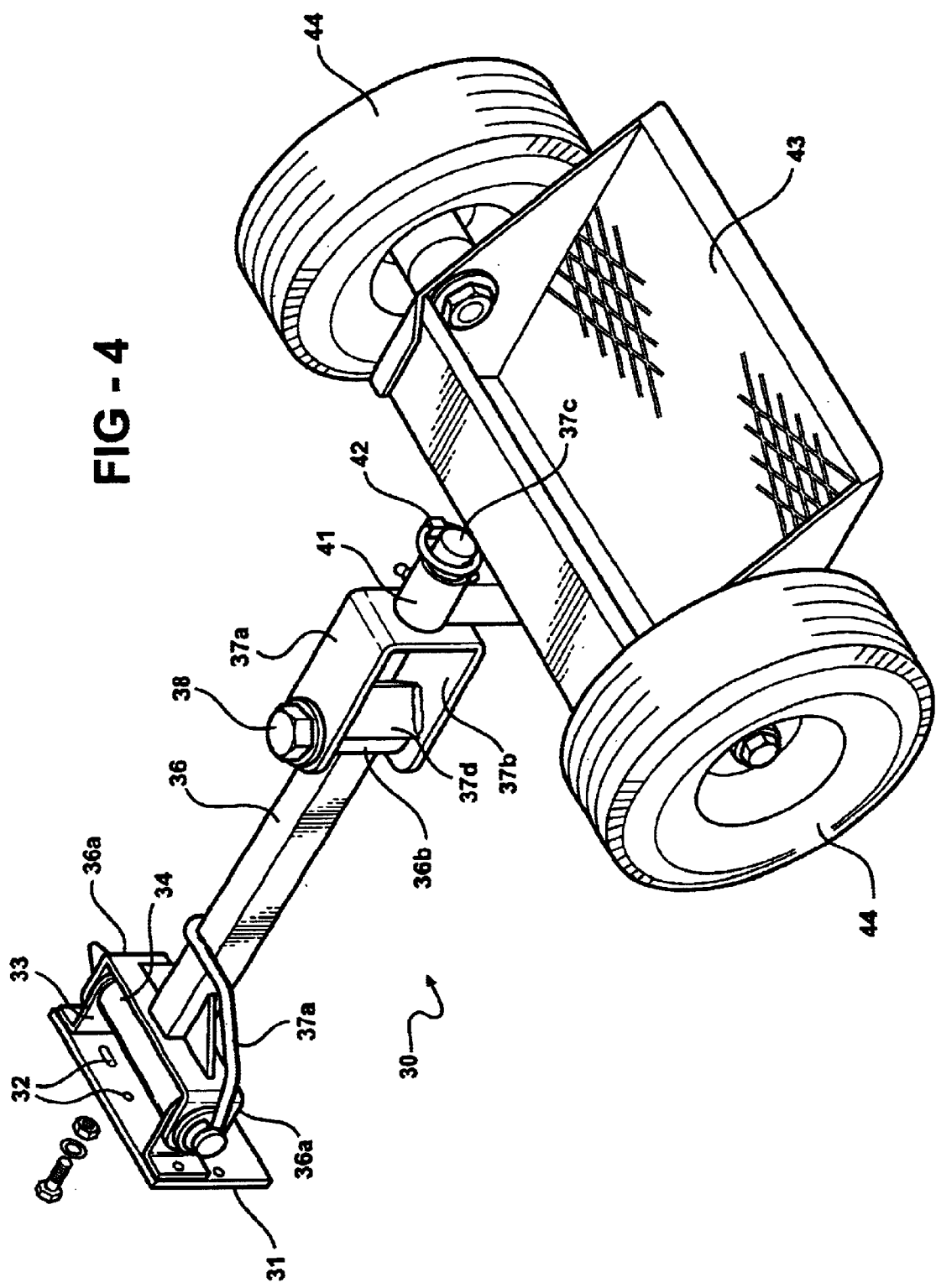
FIG. 4 is a perspective view of the improved structure illustrated in FIG. 3 shown assembled.

Referring now to FIGS. 3 and 4, there is illustrated a second embodiment of an improved structure for a sulky, indicated generally at 30, for use with a self propelled lawn mower (not shown) in accordance with this invention. The sulky 30 includes a mounting bracket 31 having one or more openings 32 formed therethrough to facilitate the securement of the mounting bracket 31 to a portion of the lawn mower, typically the rear end of a housing of the lawn mower. For example, one or more bolts (not shown) or other threaded fasteners may be used to secure the mounting bracket 31 to the rear end of a housing of the lawn mower. The mounting bracket 31 has a pair of opposed upstanding mounting ears 33 formed thereon or secured thereto in a conventional manner. For example, the mounting ears 33 may be formed from a generally L-shaped strip of metal stock that is welded or otherwise secured to the mounting bracket 31. A hollow support tube 34 is secured to and extends between the mounting ears 33. The support tube 34 may be formed from metal tubular stock, and the ends of the support tube 34 may be respectively secured to the mounting ears by welding or other means. If desired, a pair of tubular bushings 35 may be press fit within the ends of the support tube 34. The purpose for the support tube 34 and the bushings 35 will be explained below.

The sulky 30 also includes a pivot arm 36 having a first end that is connected to the mounting bracket 31. To accomplish this, the first end of the pivot arm 16 is formed or otherwise provided with a first yoke having a first pair of spaced apart yoke arms 36a having respective axially aligned openings formed therethrough. The first yoke arms 36a are spaced apart from one another by a distance that is slightly greater than the distance separating the mounting ears 33 on the mounting bracket 31. Thus, as shown in FIG. 4, the first yoke arms 36a of the pivot arm 36 can be disposed about the mounting ears 33 such that the openings formed through the first yoke arms 36a are aligned with the support tube 34. A retaining structure, such as a kick pin 37, can be inserted through the aligned openings formed through the first yoke arms 36a and the support tube 34 to pivotably connect the first end of the pivot arm 36 to the mounting bracket 31. The kick pin 37 can include a retaining member 37a that is sized and shaped to extend over a portion of the pivot arm 36 as shown in FIG. 4 to positively retain the kick pin 37 inserted through the aligned openings formed through the first yoke arms 36a and the support tube 34.

The pivot arm 36 has a second end that is formed or otherwise provided with a vertically extending hollow tubular member 36b. The tubular member 36b is preferably formed as a separate piece and permanently secured to the first end of the pivot arm 36, such as by welding. The purpose for the tubular member 36b will be explained below.

The sulky 30 further includes a yoke member including a pair of yoke arms 37a and 37b and a mounting pin 37c. In the illustrated embodiment, the yoke arms 37a and 37b are formed from a single piece of material that is formed having a generally U-shaped configuration. The yoke arms 37a and 37b have respective aligned openings formed therethrough. Preferably, the yoke arms 37a and 37b are spaced apart from one another by a distance that is slightly greater than the length of the tubular member 36b. Thus, the interior of the hollow tubular member 36b can be aligned with the openings formed through the yoke arms 37a and 37b. If desired, a generally V-shaped bracket 37d can be secured between the two yoke arms 37a and 37b, such as by welding. The bracket 37*d* provides additional strength to the yoke member and can be used as an abutment surface to facilitate the quick and easy alignment of the interior of the hollow tubular member 36*b* with the openings formed through the yoke arms 37*a* and 37*b*.

A retaining structure, such as a pivot pin 38, can be inserted through the aligned openings formed through the yoke arms 37*a* and 37*b* and through the tubular member 36*b* to pivotably connect the yoke member to the second end of the pivot arm 36. The pivot pin 38 can include a nut 38*a* that is threaded onto a threaded end portion of the pivot pin to positively retain the pivot pin 38 inserted through the aligned openings formed through the yoke arms 37*a* and 37*b* and through the tubular member 36*b*. If desired, a pair of tubular bushings 39 may be provided between the kick pin 37 and the tubular member 36*a*. The mounting pin 37*c* may be formed integrally with or secured to the first and second yoke arms 37*a* and 37*b*. The mounting pin 37*c* is preferably formed as a separate piece and permanently secured to the first and second yoke arms 37*a* and 37*b*, such as by welding. If desired, one or more bushings 37*e* may be disposed about the mounting pin 37*c* for a purpose that will be explained below. The outermost end of the mounting pin 37*c* has a transverse aperture formed therethrough, also for a purpose that will be explained below.

Lastly, the sulky 30 includes an operator platform assembly, indicated generally at 40, including a hollow tubular support tube 41 that is connected to the mounting pin 37*c*. To connect the mounting pin 37*c* to the support tube 41, the mounting pin 37*c* is inserted through the hollow tube 41. When so disposed, the outermost end of the mounting pin 37*c* extends completely through the support tube 41, allowing a retaining clip 42 to be inserted through the transverse aperture formed through the outermost end of the mounting pin 37*c*. The retaining clip 42 functions to positively connect the mounting pin 37*c* to the support tube 41. Although it connected to the mounting pin 37*c*, the support tube 41 is free to rotate relative thereto. The purpose for providing this rotatable connection will be explained below.

A standing platform 43 is formed integrally with or secured to the support tube 41 to support an operator of the sulky 30 during use. Preferably, the standing platform 43 is formed as a separate member that is secured to the central portion 41 of the support bar by welding. A wheel 44 is rotatably secured to each side of the standing platform 43. To accomplish this, respective axle assemblies 45 are provided for the wheels 44. Each of the axle assemblies 45 is conventional in the art and is provided to connect each of the wheels 44 to the standing platform 43 for relative rotational movement.

In operation, the sulky 30 is connected to the rear end of a housing of the lawn mower by means of the mounting bracket 31 and threaded fasteners. As the lawn mower is operated, the operator stands on the standing platform 43 and is towed behind the lawn mower. The pivot arm 36 of the sulky 30 can pivot upwardly and downwardly relative to the mounting bracket 31 to accommodate upward and downward movement of the standing platform 43 relative to the lawn mower, such as would occur when the lawn mower is operated over hilly terrain. The yoke member of the sulky 30 can pivot laterally (i.e., about a vertical axis defined by the pivot pin 38) relative to the pivot arm 36 to accommodate turning movement of the standing platform 43 relative to the lawn mower, such as would occur when the lawn mower is operated through a left or right turn. Lastly, the support tube 41 and the standing platform 43 can pivot transversely (i.e., about a longitudinal axis extending generally parallel with the mounting pin 37*c*) relative to the mounting pin 37*c* to accommodate transverse pivoting movement of the standing platform 43 relative to the lawn mower, such as would occur when the lawn mower is operated over laterally uneven terrain.

Figure 5:
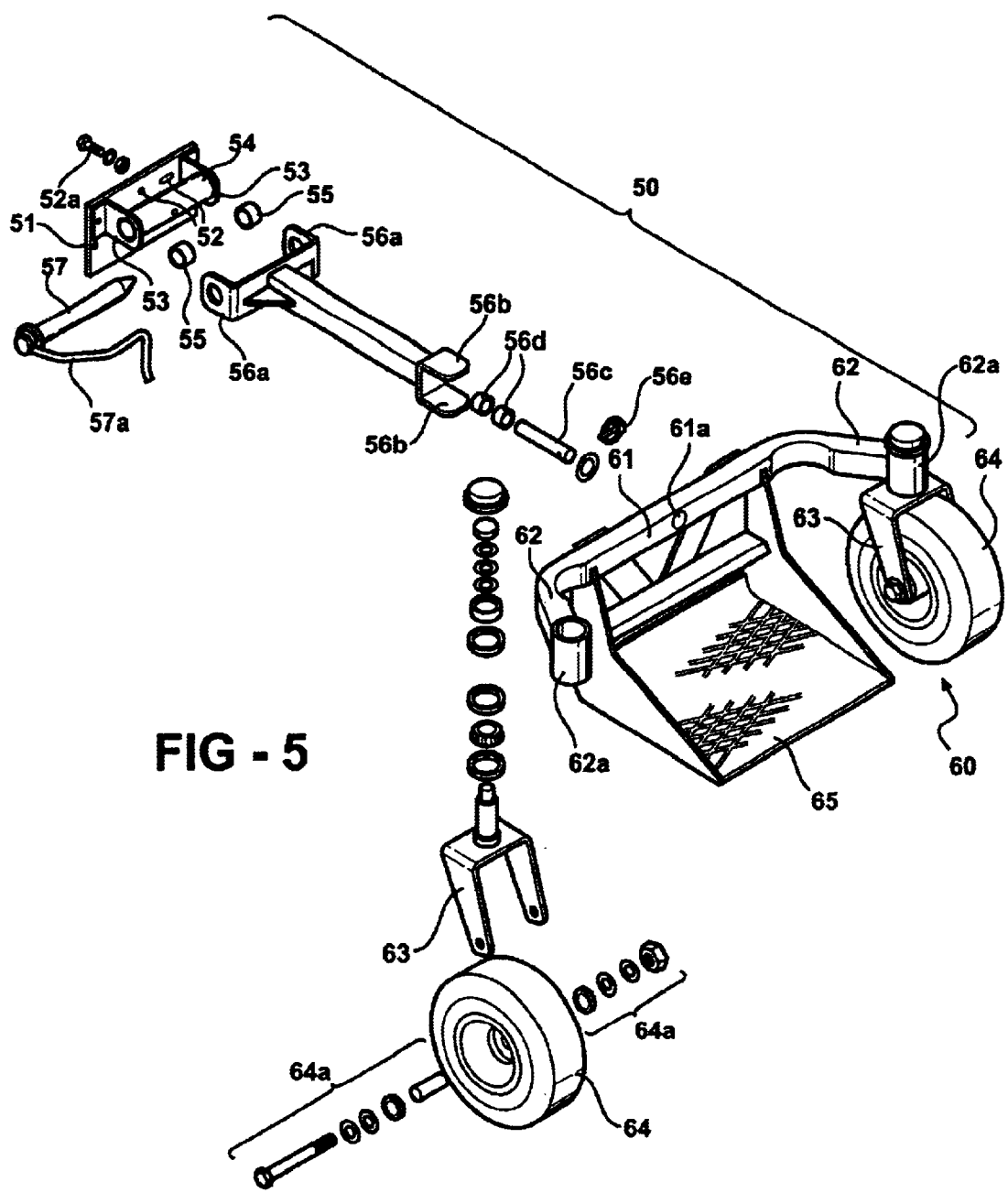
FIG. 5 is an exploded perspective view of a third embodiment of an improved structure for a sulky for use with a self propelled lawn mower in accordance with this invention.
Figure 6:
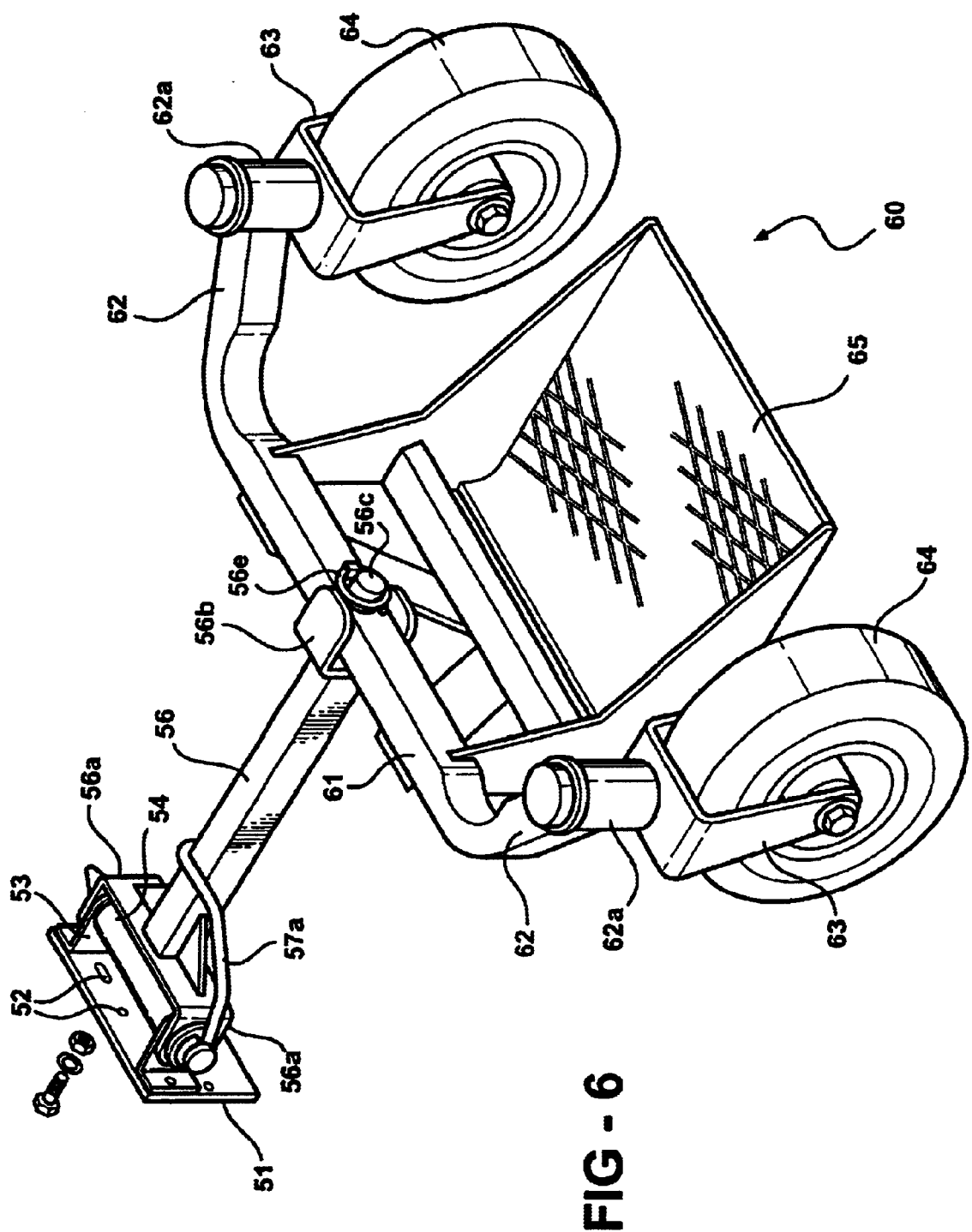
FIG. 6 is a perspective view of the improved structure illustrated in FIG. 5 shown assembled.

Referring now to FIGS. 5 and 6, there is illustrated a third embodiment of a an improved structure for a sulky, indicated generally at 50, for use with a self propelled lawn mower (not shown) in accordance with this invention. The sulky 50 includes a mounting bracket 51 having one or more openings 52 formed therethrough to facilitate the securement of the mounting bracket 51 to a portion of the lawn mower, typically the rear end of a housing of the lawn mower. For example, one or more bolts 52*a* or other threaded fasteners may be used to secure the mounting bracket 51 to the rear end of a housing of the lawn mower. The mounting bracket 51 has a pair of opposed upstanding mounting ears 53 formed thereon or secured thereto in a conventional manner. For example, the mounting ears 53 may be formed from generally L-shaped strips of metal stock that are welded or otherwise secured to the mounting bracket 51. A hollow support tube 54 is secured to and extends between the mounting ears 53. The support tube 54 may be formed from metal tubular stock, and the ends of the support tube 54 may be respectively secured to the mounting ears by welding or other means. If desired, a pair of tubular bushings 55 may be press fit within the ends of the support tube 54. The purpose for the support tube 54 and the bushings 55 will be explained below.

The sulky 50 also includes a pivot arm 56 having a first end that is connected to the mounting bracket 51. To accomplish this, the first end of the pivot arm 56 is formed or otherwise provided with a first yoke having a first pair of spaced apart yoke arms 56*a* having respective axially aligned openings formed therethrough. The first yoke arms 56*a* are spaced apart from one another by a distance that is slightly greater than the distance separating the mounting ears 53 on the mounting bracket 51. Thus, as shown in FIG. 6, the first yoke arms 56*a* of the pivot arm 56 can be disposed about the mounting ears 53 such that the openings formed through the first yoke arms 56*a* are aligned with the support tube 54. A retaining structure, such as a kick pin 57, can be inserted through the aligned openings formed through the first yoke arms 56*a* and the support tube 54 to pivotably connect the first end of the pivot arm 56 to the mounting bracket 51. The kick pin 57 can include a retaining member 57*a* that is sized and shaped to extend over a portion of the pivot arm 56 as shown in FIG. 6 to positively retain the kick pin 57 inserted through the aligned openings formed through the first yoke arms 56*a* and the support tube 54.

The pivot arm 56 has a second end that is formed or otherwise provided with a second yoke having a second pair of spaced apart yoke arms 56*b* having respective axially aligned openings formed therethrough. The second yoke arms 56*b* are spaced apart from one another by a predetermined distance. A mounting pin 56*c* is formed integrally with or secured to the second yoke so as to extend between the second yoke arms 56b. The mounting pin 56c is preferably formed as a separate piece and permanently secured to the second yoke, such as by welding. If desired, one or more bushings 56d may be disposed about the mounting pin 56c for a purpose that will be explained below. The outermost end of the mounting pin 56c has a transverse aperture formed therethrough, also for a purpose that will be explained below.

The sulky 50 further includes an operator platform assembly, indicated generally at 60, including a support bar that is connected to the second end of the pivot arm 56. The illustrated support bar is generally U-shaped, having a generally transversely extending central portion 61 and a pair of angled side portions 62. The central portion 61 of the support bar is formed having an opening 61a that is sized to receive the mounting pin 56c therethrough, as shown in FIG. 6. To connect the pivot arm 56 to the central portion 61 of the support bar, the mounting pin 56c is inserted through the opening 61a. The central portion 61 of the support bar is preferably sized to be received snugly between the second yoke arms 56b of the second yoke of the pivot arm 56, although such is not necessary. When so disposed, the outermost end of the mounting pin 56c extends completely through the central portion 61 of the support bar, allowing a retaining clip 56e to be inserted through the transverse aperture in the outermost end of the mounting pin 56c. The retaining clip 56e functions to positively connect the second end of the pivot arm 56 to the central portion 61 of the support bar.

Each of the angled side portions 62 of the operator platform assembly has a wheel assembly secured thereto. To accomplish this, each of the angled side portions 62 has a generally vertically extending tube 62a formed thereon or secured thereto. Preferably, the tubes 62a are formed as separate members that are secured to the ends of the angled side portions 62 by welding. The wheel assemblies are conventional in the art and include respective casters 63 that can be supported within the tubes 62a by various bearings, washers, seals and other well known mechanisms, indicated generally at 63a, for relative rotational movement about a generally vertically extending axis. Each of the wheel assemblies also includes a wheel 64 that is rotatably supported on the associated caster 63 by various bearings, washers, seals and other well known mechanisms, indicated generally at 64a, for relative rotational movement about a generally horizontally extending axis.

A standing platform 65 is formed integrally with or secured to the central portion 61 of the support bar to support an operator of the sulky 50 during use. Preferably, the standing platform 65 is formed as a separate member that is secured to the central portion 61 of the support bar by welding.

In operation, the sulky 50 is connected to the rear end of a housing of the lawn mower by means of the mounting bracket 51 and threaded fasteners. As the lawn mower is operated, the operator stands on the standing platform 65 and is towed behind the lawn mower. The pivot arm 56 of the sulky 50 can pivot upwardly and downwardly relative to the mounting bracket 51 to accommodate upward and downward movement of the standing platform 65 relative to the lawn mower, such as would occur when the lawn mower is operated over hilly terrain. The central portion 61 of the support bar of the sulky 50 can pivot transversely (i.e., about a longitudinal axis extending generally perpendicular relative to the pivoting axis defined by the mounting bracket 51 and the first yoke of the pivot arm 56) relative to the pivot arm 56 to accommodate transverse pivoting movement of the standing platform 65 relative to the lawn mower, such as would occur when the lawn mower is operated over laterally uneven terrain. Lastly, the wheels 64 of the sulky 50 can pivot about a vertical axis relative to the angled side portions 62 to accommodate turning movement of the standing platform 65 relative to the lawn mower, such as would occur when the lawn mower is operated through a left or right turn.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A sulky for use with a self propelled lawn mower comprising:

a mounting bracket adapted to be connected to the self propelled lawn mower, said mounting bracket including a pair of opposed upstanding mounting ears;

a pivot arm including a first end and a second end, said first end having a first hollow member provided thereon that is disposed between and pivotally connected to said mounting ears, said second end having a second hollow member;

a yoke member including a pair of yoke arms and a mounting pin, said second hollow member being disposed between and pivotally connected to said pair of yoke arms, said yoke member further having a travel limiter extending between and interconnecting said yoke arms, said travel limiter being disposed adjacent the second hollow member; and an operator platform assembly including a hollow support tube that is pivotally connected to said mounting pin.

2. A sulky for use with a self propelled lawn mower comprising:

a mounting bracket adapted to be connected to the self propelled lawn mower, said mounting bracket including a pair of opposed upstanding mounting ears having a hollow support tube extending therebetween;

a pivot arm including a first end and a second end, said first end having a pair of spaced apart yoke arms that are disposed about and pivotally connected to said mounting ears and said hollow support tube, said second end having a hollow member;

a yoke member including a second pair of yoke arms and a mounting pin, said second hollow member being disposed between and pivotably connected to said second pair of yoke arms, said yoke member further having a travel limiter extending between and interconnecting said second yoke arms, said travel limiter being disposed adjacent the hollow member; and an operator platform assembly including a hollow support tube that is pivotally connected to said mounting pin.

3. A sulky for use with a self propelled lawn mower, the sulky comprising:

a mounting bracket configured to be connected to the lawn mower;

a pivot arm having a first end pivotally interconnected with the mounting bracket, the pivot arm extending generally rearwardly to a second end, the second end including a generally vertical tubular member;

a yoke member having a forward end with a spaced apart upper and lower arm, the vertical tubular member being disposed between and pivotally interconnected with the upper and lower arms, the yoke member including a travel limiter extending between the upper and lower arms and disposed adjacent the vertical tubular member; the yoke member further including a rearward end; and an operator platform assembly, the assembly being pivotally interconnected with the rearward end of the yoke member.

4. The sulky according to claim 3, wherein the travel limiter has a generally V-shaped horizontal cross section with the interior angle of the V-shape facing the vertical tubular member.

5. The sulky according to claim 3, wherein the pivotal interconnection between first end of the pivot arm and the mounting bracket has a generally horizontal transverse pivot axis.

6. The sulky according to claim 3, wherein the pivotal interconnection between the operator platform assembly and the yoke member has a generally horizontal longitudinal pivot axis.

7. The sulky according to claim 3, wherein the operator platform assembly further comprises a platform and a pair of wheels rotationally attached to the platform.

* * * * *